P. FISCHER.
ELECTRODE HOLDER FOR ELECTRIC FURNACES.
APPLICATION FILED JUNE 8, 1917.
1,259,842.
Patented Mar. 19, 1918.
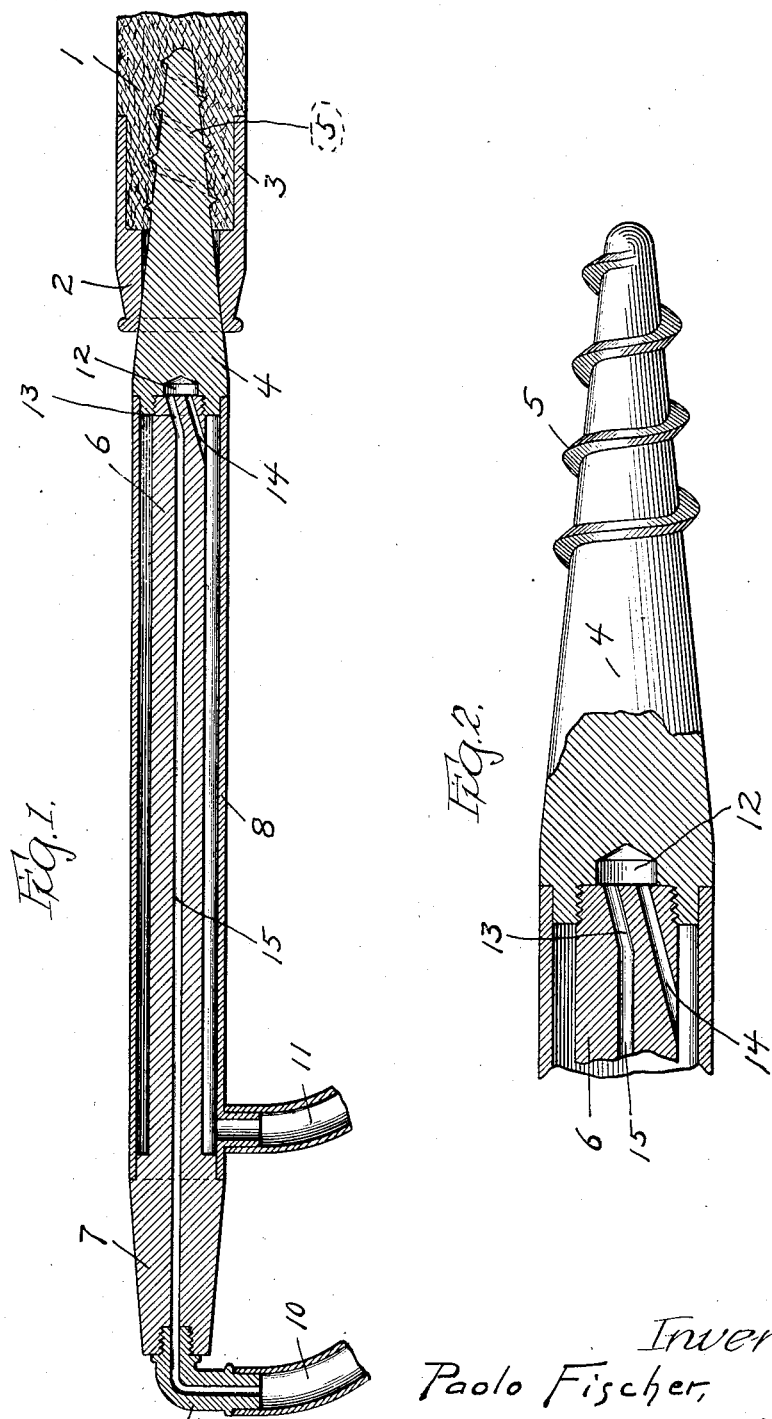

UNITED STATES PATENT OFFICE.

PAOLO FISCHER, OF CHICAGO, ILLINOIS.

ELECTRODE-HOLDER FOR ELECTRIC FURNACES.

1,259,842.

Specification of Letters Patent.

Patented Mar. 19, 1918.

Application filed June 8, 1917. Serial No. 173,467.

*To all whom it may concern:*

Be it known that I, PAOLO FISCHER, citizen of Italy, residing at Chicago, Illinois, have invented certain new and useful Improvements in Electrode-Holders for Electric Furnaces; and I do hereby declare the following to be a full, clear, and exact description of the invention, such as will enable others skilled in the art to which it appertains to make and use the same.

My invention relates to holders for the carbons or electrodes of electric furnaces and the like, its general objects being to provide means for quickly and firmly securing the electrode to the holder, to reinforce the electrode at its attached end, and to provide simple and effective means for cooling both the holder and the attached end of the electrode. Furthermore, my invention aims to provide a holder so arranged that the cooling of the same will be independent of the sliding or adjustment of the holder, and that neither the cooling means nor the means of attaching the carbon to the holder will interfere with the desired shifting of the carbon with respect to the furnace, or with the entire withdrawal of the carbon from the furnace. My present invention relates both to means for detachably securing the carbon to the holder and for cooling the latter independently of the means provided for cooling the chamber through which both enter the furnace.

Illustrative of the means whereby I accomplish these and other objects, Figure 1 shows a central longitudinal section through an electrode holder and the attached end of the carbon electrode.

Fig. 2 is a fragmentary enlarged view of the forward end of the holder.

Referring to the drawings, I desirably equip the rear or proposed outer end of the carbon 1 with a tapering bore corresponding to a continuation of the tapering bore of a metal ferrule 2, which ferrule has a socket portion 3 adapted to slip over the rear end of the carbon. Into the said tapering bore in the carbon I screw the tip of the end-piece 4 of my holder, which end-piece has a taper corresponding to the two tapers above mentioned and also has its tip portion equipped with a raised thread 5 somewhat after the manner of the tip of a wood screw. The end-piece 4 as described is fast upon a tubular shank 6, which shank carries an enlarged tail-piece 7 at its other end, and both the end-piece and the tail-piece have shoulders for receiving the ends of a tubular casing 8 and for spacing the latter from the shank 6. Fast upon the tail-piece 7 is an inlet 9 (here shown as a pipe elbow) for admitting water from any suitable source, as from a hose 10. Likewise, the casing 8 is provided at its rear end with an outlet leading to a hose 11, and the space between the casing and the shank 6 of the holder is connected to the bore of this tubular shank near the forward end of the latter. For this latter purpose, I desirably equip the rear end of the metal end-piece 4 with a recess 12 connected by two bores 13 and 14 respectively to the bore 15 of the shank 6 and to the annular chamber between this shank and the casing 8.

With the parts thus constructed, it will be obvious from the drawings, that water supplied from any suitable source through the rear hose 10 will enter the bore 15 at the rear or cooler end of the holder, and that after traversing this bore to the recess 12, the water will return through the annular chamber or water-jacket surrounding the shank 6 and will be discharged through the outlet hose 11. Consequently, the shank of the holder will be subjected to the influence of the cooling fluid both from within and from without while the end-piece 4 will not only be cooled by conduction to the attached tubular shank 6, but also by the passage of the water through the recess 12. By thus applying the water-jacket directly to the stem of the holder, I am able to secure a much more effective cooling than that heretofore obtained by the cooling of the bushings through which such holders enter the walls of furnaces. Moreover, instead of subjecting only a short portion of the holder to the cooling influence (as in the case of such water-cooled entrance bushings), I am able to subject almost the entire length of the holder continuously to the cooling liquid; and, since the water may readily be supplied and discharged through flexible hose, I can readily continue this effective cooling regardless of the adjustment of the holder with respect to the furnace, even continuing the same when the carbon and the adjacent end of the holder are entirely withdrawn from the furnace.

At the same time, the tapering screw tip of my holder permits of a simple and easy attaching to the carbon, while the socket portion 3 of the ferrule reinforces the attached end of the carbon and prevents a damaging of the latter during the insertion of the said screw tip. So also, the tapering bore of the ferrule 2 coöperates with the said screw tip in firmly drawing the ferrule against the unthreaded part of the forward end-piece 4, thereby insuring the needed rigidity. However, while I have pictured and described desirable details of construction, I do not wish to be limited to the same, since modifications might obviously be made without departing from the spirit of my invention.

I claim as my invention:

1. In a holder for an electric furnace electrode, a tubular shank, and a casing surrounding said shank and spaced therefrom to afford a passage surrounding the shank, the said passage being connected to the bore of the tubular shank, in combination with fluid inlet and outlet means associated respectively with the said bore and passage.

2. In a holder for an electric furnace electrode, a tubular shank, and a water jacket surrounding the shank and connected to the bore of the tubular shank for compelling the cooling water supplied to the water jacket to traverse said bore also.

3. The combination with an electric furnace electrode, of a holder therefor including a pair of relatively spaced concentric tubes affording an annular passage therebetween, said passage being connected at one end to the bore of the inner tube, and fluid supply and fluid inlet pipes connected respectively to the other end of said bore and to another portion on said passage.

4. In a holder for an electrode, a forward head arranged for attachment to the electrode, a rear head connected to the circuit, a central stem fast upon both heads, and a casing surrounding and spaced from said stem to afford a passage therebetween, the stem having a longitudinal duct connected at its forward end to said passage and extending through the rear head, a fluid inlet mounted on the rear head and connected to the duct, and a fluid outlet mounted on the casing and connected to said passage.

5. A holder constructed as per claim 4, with the connection between the duct and the passage formed within the forward head.

6. In a holder for an electric furnace electrode having a tapered bore at one end, a conducting member equipped at one end with a tapering and threaded tip screwed into said bore, and a collar carried by said member outwardly of said tip and surrounding the said end of the electrode.

7. The combination with an electric furnace electrode, of a metal reinforcing member fast upon one end of the electrode, said member comprising a tubular portion surrounding a portion of the electrode and another portion disposed beyond the end of the electrode, both the latter portion and the adjacent end of the electrode being equipped with a continuous tapering bore; and a holder equipped with a tapering end entering said bore and corresponding in taper to the latter, the tip portion of said holder end being provided with a raised thread engaging adjacent portions of the electrode.

8. The combination with an electrode having a bore at one end, of a holder equipped with a screw tip threaded into said bore and tending to expand said bored end, and a tubular member fast on the holder and closely surrounding the bored end of the electrode to prevent the expansion of said end.

Signed at Chicago, June 6th, 1917.

PAOLO FISCHER.